United States Patent [19]

Baird et al.

[11] Patent Number: 5,410,697
[45] Date of Patent: Apr. 25, 1995

[54] CONCURRENCY MANAGEMENT USING VERSION IDENTIFICATION OF SHARED DATA AS A SUPPLEMENT TO USE OF LOCKS

[75] Inventors: Robert Baird, San Jose, Calif.; George Eisenberger, White Plains; Alexander S. Lett, Mahopac, both of N.Y.; James J. Myers, San Francisco, Calif.; William H. Tetzlaff, Mount Kisco; Jay G. Unger, Mohegan Lake, both of N.Y.

[73] Assignee: International Business Machines Corporation, Armonk, N.Y.

[21] Appl. No.: 132,433

[22] Filed: Oct. 6, 1993

Related U.S. Application Data

[63] Continuation of Ser. No. 504,766, Apr. 4, 1990, abandoned.

[51] Int. Cl.⁶ .............................................. G06F 15/16
[52] U.S. Cl. .................................... 395/650; 395/600; 364/DIG. 1; 364/243.41; 364/243.44; 364/246.8; 364/228.1; 364/281.4
[58] Field of Search ............................. 395/650, 600; 364/243.41, 243.44

[56] References Cited

U.S. PATENT DOCUMENTS

| | | | |
|---|---|---|---|
| 3,400,371 | 9/1968 | Amdahl et al. | 340/172.5 |
| 4,207,609 | 6/1980 | Luiz et al. | 364/200 |
| 4,612,612 | 9/1986 | Woffinden et al. | 364/200 |
| 4,716,528 | 12/1987 | Crus et al. | 364/200 |
| 4,843,542 | 6/1989 | Dashiell et al. | 364/200 |
| 5,060,144 | 10/1991 | Sipple et al. | 364/200 |
| 5,210,848 | 5/1993 | Liu | 395/425 |
| 5,263,155 | 11/1993 | Wang | 395/600 |
| 5,263,156 | 11/1993 | Bowen | 395/600 |

OTHER PUBLICATIONS

Lorin and Deitel "Operating Systems", The System Programming Series, copyright 1981 by Addison-Wesley Publishing Co., Chapter 9, re resource management pp. 231-239.

Maekawa et al, "Operating Systems Advanced Concepts", copyright 1987, The Benjamin/Cummings Publishing Co., pp. 187-188.

Bozman et al, US patent application "A Method for Managing a Data Cache Using Virtual External Storage Addresses as Agruments", Ser. No. 07/477,704.

Sakti P. Ghosh, "Data Vase Organization for Data Management", copyright 1977, pp. 33-41.

C. J. Date, "An Introduction to DataBase Systems", 3rd Edition, part 3, re The Hierarchical Approach, copyright 1981, pp. 273-386.

Please refer to co-pending patent application, Ser. No. 07/493,581 for copy of IBM Publication GC28-1150, "MVS/Extended Architecture System Programming Library: System Macros and Facilities", vol. 1.

Primary Examiner—Kevin A. Kriess
Assistant Examiner—Kakali Chaki
Attorney, Agent, or Firm—Douglas R. Millett

[57] ABSTRACT

A method for managing concurrency using a serializing token as a supplement to locks for accessing the same page by different processes and ensuring coherence between data caches and a shared access backing store supporting the processes defined onto multiple processors. A shared lock and a new token are issued by a local lock manager (LLM) and local cache manager (LCM) in response to a page read request from a process. An exclusive lock, an invalidation of all cache resident copies of the page, a cache write through to backing store of the changed page, a copyback of a new token, and lock release are responsive to a page write/update request from a process where the token issued to the process during a prior request matches the token stored with a cache resident copy of the page. Otherwise, a write request fails and the process must first issue a read request to the page of interest.

5 Claims, 11 Drawing Sheets

STORAGE IN RELATION TO A CPU

CONCURRENCY MANAGEMENT USING VERSION IDENTIFICATION OF SHARED DATA AS A SUPPLEMENT TO USE OF LOCKS

This application is a continuation of application Ser. No. 07/504,766, filed Apr. 4, 1990, now abandoned.

FIELD OF THE INVENTION

This invention relates to managing computer storage in distributed systems, and more particularly, to token oriented methods supplementing locks for managing concurrency among processes accessing the same page copied from shared external store.

DESCRIPTION OF RELATED ART

The following paragraphs summarize the concepts and references deemed pertinent to lock and cache management in a distributed system.

DISTRIBUTED SYSTEM DEFINED, CPU, AND SOME OPERATING CONSTITUENTS

A "distributed system" for purposes of this invention comprises two or more processors having shared access to a DASD oriented external storage subsystem. Each CPU or processor of such a system typically includes a local operating system (OS), RAM oriented internal store, local instruction and data caches operatively formed from processor internal store, a shared access external store, and lock and cache resource managers.

Applications (processes/tasks) executing on a CPU generate read and write operations by way of the OS. In turn, the read and write operations utilize the data cache and lock resource managers to establish directory lockable access paths to pages either resident in the data cache or as refreshed into the data cache from the shared external store.

INTERNAL AND EXTERNAL STORAGE

Because storage costs increase dramatically with speed, many computer systems divide the physical storage subsystem into a number of performance levels. Some of these levels, such as DASD and tape, have been treated as shared access peripheral I/O devices and are accessed over an asynchronous path. Other levels, such as RAM and cache, have been treated directly by system hardware and accessed over a synchronous path as part of internal storage.

The term "internal storage" specifies that portion of storage randomly addressable for single read or write transfers. In IBM systems, internal storage is byte addressable except for an extension ("expanded store"). Expanded store is random accessed on a block or page addressable (4096 bytes/page) basis. It is managed as an LRU real memory backed paging store. Lastly, "external storage" refers to that bulk portion of storage that is not randomly addressable and must be directly accessed as on DASD.

RESOURCE MANAGERS

As pointed out by Lorin and Deitel, "Operating Systems", The System Programming Series, copyright 1981 by Addison-Wesley Publishing Co., chapter 9 re resource management, a "resource manager" is a software OS construct defined on a CPU and given a set of attributes relating to the accessibility of the resource and its physical representation in the system. Lorin further points out that the function of the operating system in this respect is to define an abstract machine composed of abstract resources that are conveniently manipulated by processes. Thus, technical and economic use and coherence of resources are regulated by resource managers.

It should also be appreciated that a resource manager can also be expressed as a "monitor". A monitor is also a software OS construct comprising a collection of procedures associated with a type of resource. It is responsible for allocating the resource and for controlling references to it. Furthermore, each monitor has exclusive access to any tables or other structures containing information about the resource for which it is responsible. The distinctive feature of the monitor is that it contains a section of data that is designed for public use but that cannot be accessed except through the monitor.

LOCKS AND LOCK MANAGEMENT

A locking function serializes access by processes to at least one selected system resource other than the processor. A lock manager qua monitor in the context of this invention is a software construct for controlling access to cache stored pages among other resources. This is mandated by the need for coherency among pages and directories in general and among versions of the same page in a distributed system having multiple local data caches in particular.

An operating system such as MVS used in the IBM System/370 includes a hierarchy of locks for various resources in the system. Locks are at least a function of name, scope, and exclusivity. With respect to scope, a global lock affects either the entire system or an entire resource. In contrast, a local lock in the storage context may affect only a single address space or a single page or page group. A lock may be exclusive or shared. Shared locks on pages in memory or storage are most often associated with read and copy operations while exclusive locks are associated with write/update and move operations. Also a lock may be atomically promoted or demoted either in scope, exclusivity, or both.

As part of establishing an access path to a cache from a task or process, the cache manager accesses the local or global lock manager as the case admits. Depending upon the nature and scope of the access request and the current state of the lock, the request may be granted in whole or modified form or denied.

Resource managers including cache and lock managers use various tables to indicate the current control state of their resource. The process for grant, modification, or denial of a lock in any particular instance requires the lock manager to access its table and interpret the current state thereof. If the lock state changes in any respect, the lock manager must alter the lock table to reflect that change.

CACHE AND CACHE INVALIDATION

A "cache" may be formed either as a software or hardware resource. It is defined as an indexable LRU ordered collection of pages in a buffer. It is usually positioned in a path to data or instructions so as to minimize access time. If implemented as a software construct, a cache can be located anywhere in processor internal store. Alternatively, an example of a hardware cache may be found in Woffinden et al, U.S. Pat. No. 4,612,612, "Virtually Addressed Cache", issued Sep. 9, 1986. In both the software and hardware form, the cache manager controls the cache through a cache directory and page tables.

Relatedly, the term "cache invalidate" refers to either having the cache manager qua monitor remove the "outdated page" (a page being updated over another access path) from a cache directory or provide indication that a named page located therein is invalid. Alternatively, the cache manager could cause the updated page to overwrite the current page in cache.

In the class of storage management methods to which this invention pertains, each cache directory holding an old copy of the page being updated somewhere else merely erases a counterpart directory entry. Advantageously, no data movement is required. Such is not the case where a changed or updated page overwrites all distributed copies. That is, when the base page is altered on some other data path, then directory erasure constitutes a less data movement intensive alternative to the overwriting. Countervailing, when a process references a local cache wherein an old page was deleted, then the page as updated must be copied in from external storage.

An example of page overwriting may be found in Dashiell et al, U.S. Pat. No. 4,843,542, "Virtual Memory Cache for Use in Multi Processing Systems", filed Nov. 12, 1986, issued Jun. 27, 1989. Dashiell obtains consistency in a multiple processor/virtual cache system using main memory as a backing store by having the requesting processor copy a page update to all caches holding the equivalent of a share lock prior to writing to local cache.

THE CRUS AND MAEKEWA REFERENCES

Crus et al, U.S. Pat. No. 4,716,528, "Method for Managing Lock Escalation in a Multiprocessing, Multiprogramming Environment", issued Dec. 12, 1987, describes and claims a method utilizing a coordinated pair of locking limits for managing concurrency and lock granularity trade-off relations. A first limit is placed on the number of small granularity locks per resource. A second limit is placed on the number of locks assignable to each process. When the first number of small locks is reached, the method withdraws the small locks and grants only one lock to the entire resource (lock escalation). When a process requests an additional lock over the second limit, the lock is refused.

Maekawa et al, "Operating Systems Advanced Concepts", copyright 1987 The Benjamin/Cummings Publishing Company, pp. 187–188, re Ethernet describes the optimistic concurrency management embodied in the Ethernet system. Such management assumes that when a conflict (concurrent contention for the same resource by at least two processes) is detected that either or both processes will backout and retry at a later time either on a scheduled or opportunistic basis.

SUMMARY OF THE INVENTION

It is an object of this invention to devise a method which minimizes the number of additional locks needed to manage in-flight processes defined onto multiple processors in establishing access paths to directory lockable pages, the processes occasionally and concurrently accessing the same page or version thereof in a distributed system.

It is another object of this invention to devise a method which renders the page content of any data caches used in said distributed system consistent with external storage.

The foregoing objects are believed satisfied by a method executing on processors each having local lock (LLM) and cache managers (LCM). The exclusive locks are used to manage concurrency (conflict) among processes updating either the same page in local cache or copies thereof resident in other caches among the processors.

If process originated accesses (read/write ops) to data (pages) are assumed to be randomly distributed among different processes executing across the same or multiple processors and are also assumed to have a high probability of collision, then a lock-as-you-go or pessimistic model is said to pertain. If a low probability of collision is assumed, then a mechanism other than locks such as backout and opportunistic retry of the access requests may be used either in lieu of or as a supplement to the locks. The latter is termed an optimistic model of concurrency.

In the method of this invention, processes generating concurrent read requests to the same page are each (1) granted nonexclusive (share lock) by the LLM, (2) a copy of the addressed page and (3) a page version number from the LCM. The LCM is used to detect a change in the access path to data within the update scope as some indication of conflict. That is, a write (update) request plus version number from a process is granted only upon comparison match to the version number originally issued. This causes the LCM to request a lock promotion (exclusive lock) from the LLM.

In order to maintain coherency among cache page copies, the LLM's communicate the contention (lock promotion request from the LCM) to all holders (processes) of nonexclusive locks on the same page. At this point, the LCM removes locally cached copies and causes the share locks to be relinquished. Next, the LLM grants an exclusive to the process write requester. After this, the changed page including a new version number is written through the local cache to external store. Lastly, the lock state to the current lock holder is demoted from exclusive to share.

It is another aspect of the method of this invention that processes with conflicting updates to the same page back out and retry their access request to the page. This is accomplished by acquiring a share lock prior to acquiring an exclusive lock. The share/exclusive lock granting order is the only granting order which ensures a comparison match between the version number obtained by a process seeking to write a page update and the version number retained by the LCM.

DESCRIPTION OF THE PREFERRED EMBODIMENT

The Host CPU Environment for Executing the Method of the Invention

The invention can be conveniently practiced in a configuration in which each CPU in the system is an IBM/360 or 370 architected CPU having an IBM MVS operating system. An IBM/360 architected CPU is fully described in Amdahl et al, U.S. Pat. No. 3,400,371, "Data Processing System", issued on Sep. 3, 1968. A configuration involving CPU's sharing access to external storage is set forth in Luiz et al, U.S. Pat. No. 4,207,609, "Path Independent Device Reservation and Reconnection in a Multi-CPU and Shared Device Access System", filed May 8, 1978, issued Jun. 10, 1980.

An MVS operating system is also set out in IBM publication GC28-1150, "MVS/Extended Architecture System Programming Library: System Macros and Facilities", Volume 1. Details of standard MVS or other operating system services such as local lock management, subsystem invocation by interrupt or monitor, and the posting and waiting of tasks is omitted. These OS services are believed well appreciated by those skilled in the art.

Some Relations Among CPU's, Caches, and Storage

For purposes of this invention, a page consists of a fixed number of data bytes such as 4096. Also, the term "buffer" is used in this invention to mean a designated memory address for temporarily storing data usually by a process.

Figure 1:
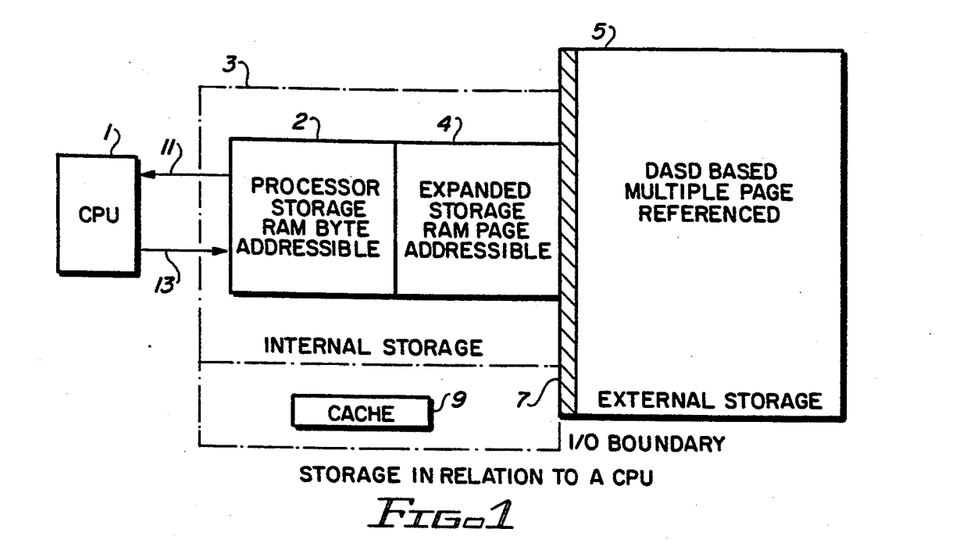
FIG. 1 sets out the organization of storage in relation to a large main frame CPU according to the prior art.

Referring now to FIG. 1, there is shown the relationship of organized storage to the CPU. As depicted, CPU 1 accesses both internal storage 3 and external storage 5 over paths 11 and 13. Internal storage 3 includes processor storage 2 whose contents are byte addressable and randomly accessible and expanded storage 4 whose contents are page addressable and randomly accessible. External storage 5 comprises one or more DASD and stores the page of the information referenced by applications executing on CPU 1.

Typically, an application invoking the CPU processor would reference a page by either its virtual/linear or real space address to a cache. In this regard, cache 9 could be hardware or software implemented. If software implemented, the cache could be located anywhere in internal storage 3. If the page is not available in cache 9, then either expanded storage 4 or not available in cache 9, then either expanded storage 4 or external storage 5 need be accessed.

Where multiple pages are accessed across the I/O boundary 7 in external storage, they may be processed according to methods as set forth in the above-mentioned Luiz patent. Parenthetically, when an access is made to internal storage the processor waits until the access is completed. When access is made across the I/O boundary, the processor invokes another task or process while awaiting fetch (access) completion.

Virtual Address and Virtual External Storage Address

In the copending Bozman et al, U.S. patent application "A METHOD FOR MANAGING A DATA CACHE USING VIRTUAL EXTERNAL STORAGE ADDRESSES AS ARGUMENTS", Ser. No. 07/477,704, filed on Feb. 9, 1990, there was described a method to manage the access pages mapped into a very large virtual external address space (VESA) through a cache without disturbing the logical view (virtual name) of the data and without having to assign physical or real backing store to said logical view.

In the copending application, two levels of address indirection are used to avoid both synonym problems and multiple copying of pages common to different logical views (page organized files) of the pages in cache. As used, pages are referenced according to their address in a linear space as mapped into a virtual external storage address (VESA) and then as mapped into a physical address in external storage. In this regard, the referenced pages are written into cache using their VESA addresses as indexing arguments. That is, the pages are written into a cache and indexed (ordered) by their VESA addresses.

Lock Management With Respect To Shared Resources

There are several ways by which global lock management of resources can be perfected. One of the simplest is to designate one of the processors (say processor 1) as the repository of the global lock manager including the capability to create an extended table. Also, the cache managers are extended such that when an application executing on processor 2 causes a read or write ops to be dispatched by the OS and trapped by the cache manager for processor 2, the cache manager requests a lock from the lock manager on processor 1. Communication of messages among the processors are perfected either by way of "mail drop" or use of a channel-to-channel adapter.

Hierarchically Related Pages

Pages may be arbitrarily grouped together wherein the group name is the root or node of a tree and the pages are its leaves. Such pages may be externally stored at logically contiguous VESA addresses or real addresses. Contiguity of addresses is a convenience. It does not materially affect the method of the invention.

Certainly, a hierarchic (tree) directory of nodes having leaf pages attaching any of the nodes in balanced or unbalanced fashion are writable to external store. Any such arrangement of pages for purposes of this invention is denominated as a group of "hierarchically related pages". Note, tree organized directory of pages and the like may be found in file management and operating systems for CPU's large and small. Reference can be made to the "IBM Disk Operating System Version 4.0", first edition, copyright IBM 1981, 1988 with respect to the PS2 Mod 60, 70, and 80 family of microprocessor based CPU's and to Sakti Ghosh, "Data Base Organization for Data Management", at pages 33–41, copyright 1977 by Academic Press Inc for a formal description of a hierarchical view of data and relations at a main frame CPU. Also, a programming IMS description is set out in C. J. Date, "An Introduction to Database Systems", 3rd Edition, Part 3 re The Hierarchical Approach, pp. 273–386, copyright 1981 by Addison-Wesley Publishing Company.

Scenarios Illustration the Method of the Invention

Two scenarios are set out for illustrating aspects of the method of this invention. The first is described in relation to FIGS. 2–9 and the second in relation to FIGS. 10–16. In these scenarios, it is assumed that local cache synchronization is implemented using a local lock manager and the notify on conflict feature thereof.

Figure 2:
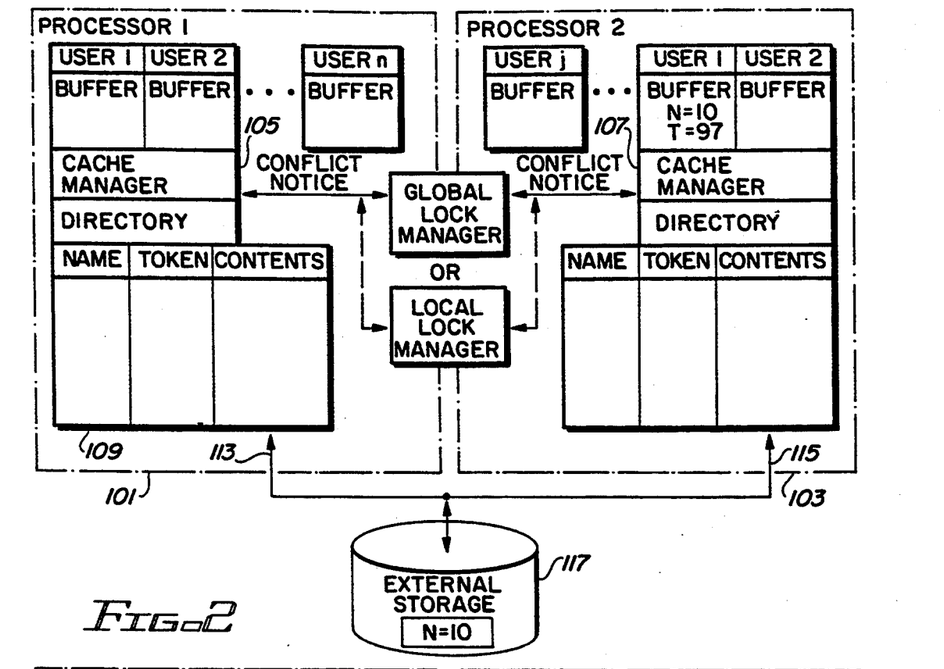
FIGS. 2–9 depicts three processes defined on two processors competing in the updating of a single page according to the method of the invention.

Referring now to FIG. 2, there is shown a distributed system including CPU's 101 and 103 also denominated processors 1 and 2, local LCM's 105 and 107, modified cache tables 109 and 111, and external storage subsystem 117 accessed over paths 113 and 115. The local lock managers (LLM's) are not shown since the advance in the art modifies the LCM rather than the LLM behavior.

The first part [events (1)–(8)] of the first scenario assumes a pair of active concurrent processes or users on processor 1 and no defined circumstance with respect to a process or user on processor 2. The second part [events (9)–(14)] of the first scenario depicts three processes defined on two processors competing to update the same page.

One aspect to be considered is the fact that the LCMs operate a token service as a by-product of normal cache consistency. This allows the updates to be serialized eliminating the need for locking other than that obtained by the token match or the opportunistic redo (shared read lock, token match, exclusive lock).

First Part/First Scenario (1) Processor1.User1 has made a read request on page N. LCM 105 acquires a share page lock in the read state from the LLM. The LCM 105 returns a copy of the page plus a unique serial identifier (say a3) to Processor 1.User1. The serial identifier is monotonically changed by the LCM. Note, each LCM maintains and changes its own identifiers.

(2) Processor1.User2 also requests to read page N. The LCM 105 returns a copy of the page and the same serial ID number 'a3' to Processor1.User2.

(3) Processor1.User2 performs updates on the page in its local buffers. It presents a changed page N to the LCM 105 along with the serial ID 'a3' as originally assigned.

(4) LCM 105 performs a comparison match between the most recent serial ID assigned to page N as issued by the LCM and the ID accompanying the changed page N. Only upon a comparison match, will the LCM requests an exclusive lock from the LLM. Assuming for purposes of discussion that a match is made.

(5) LCM 105 requests an exclusive lock from the LLM (not shown). In turn, the LLM will signal the presence of contention other holders of the page on processor 1 through LCM 105.

(6) Also, the LLM in processor 1 will signal contention to the LLM in processor 2. The LLM in processor 2 will operate through LCM 107 to cause any copies of page N resident therein to be purged and any locks thereon to be released.

(7) In processor 1, the LLM grants an exclusive lock and LCM 105 causes a write through of the changed page N to be made to external storage 117. LCM also generates a new serial ID 'a4' on page N and returns the same to Processor1.User 2.

(8) Processor1.User 1 now requests LCM 105 to write a changed page N. The LCM performs a match between the ID "a3" accompanying the page update write request and "a4" the current ID assigned to page N. Since there is a mismatch, then the update request fails. Processor1.User1 has to re read the cached page N as updated by Processor1.User2 and re apply its update.

Second Part/First Scenario

Referring again to FIG. 2, it should be noted that the cache directory tables 109 and 111 are modified to include a page name, token (serial ID), and contents. Also, applications (processes) are shown as conceptually running on top of the LLM, LCM and other OS resources.

(9) Referring again to FIG. 2, assume contention between processes executing on processors 1 and 2. Also, note that page N has the value of 10 as stored in external store 117. Processor2.User1 has read a copy of page N=10 into LCM 107 and to local buffers. A token ID of '97' has been assigned thereto. This ID is local to LCM 107. The counterpart entry appears in local buffers and table 111.

Figure 3:
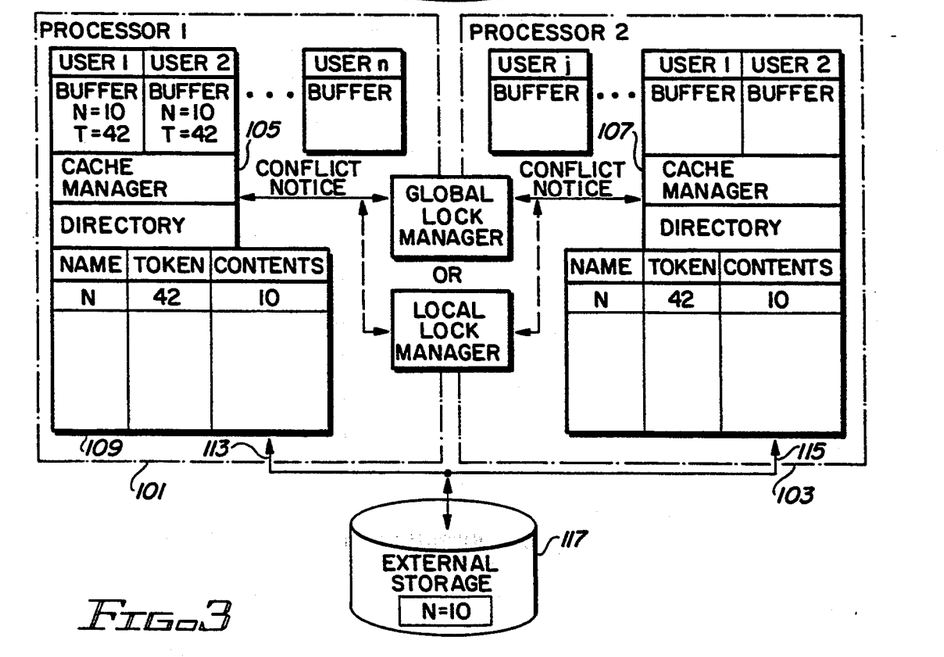

Referring to FIG. 3, Processor1.User1 and Processor1.User2 have similarly each read a copy of page N=10 into their local buffers through LCM 105. The current local token ID assigned thereto is '42'. The counterpart entry appears in the local buffers and table 109.

Figure 4:
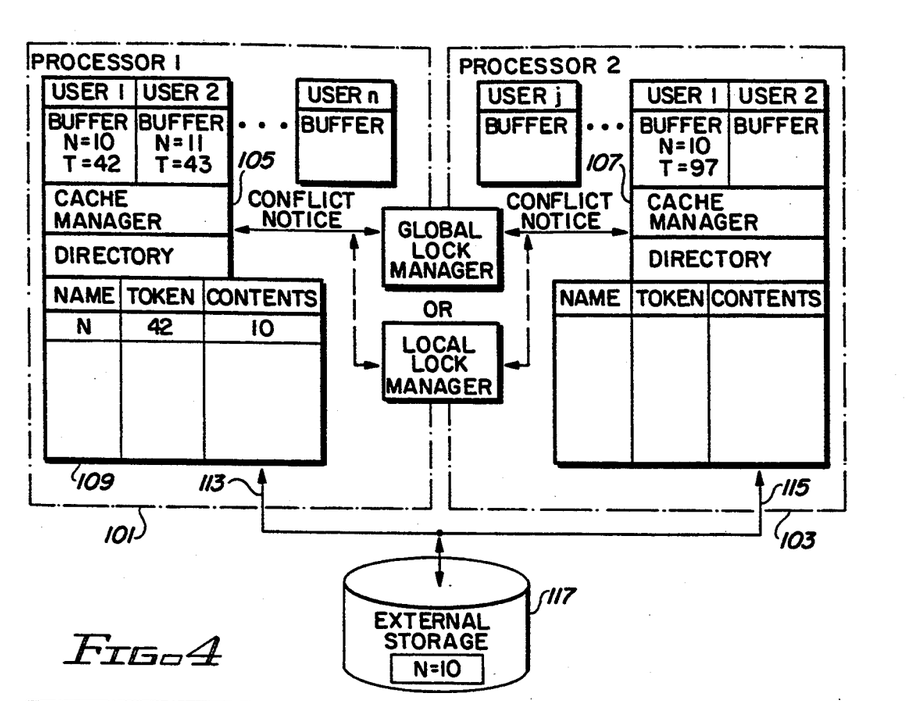

Referring to FIG. 4, Processor1.User2 updates page N=11 and requests an update write and token '42" to LCM 105. At the same time, the page N=10 contents of LCM 107 of processor 2 age out of the system. This is manifest by no entry in table 111.

Figure 5:
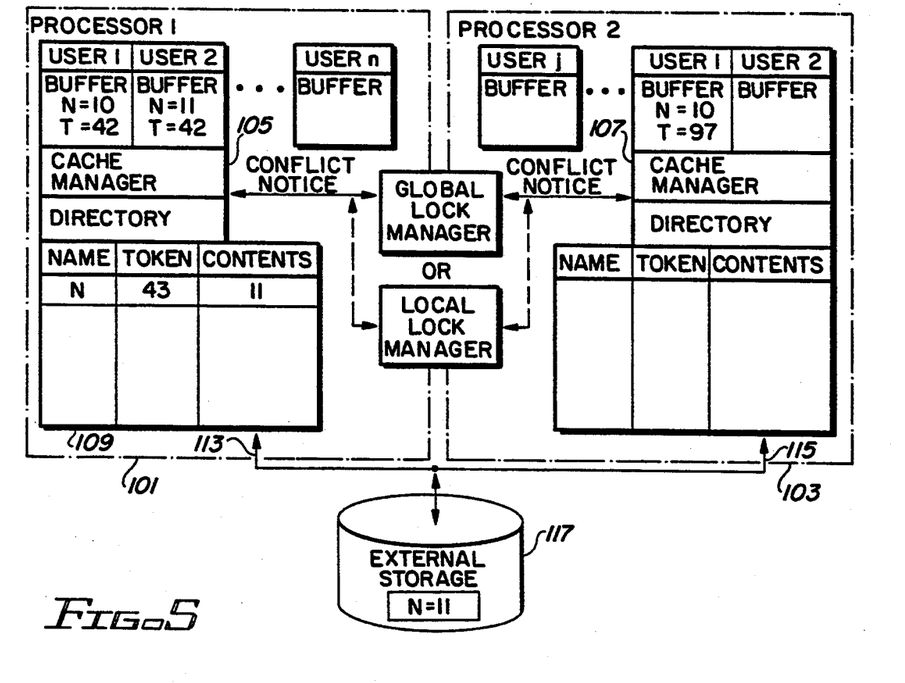

(10) Referring to FIG. 5, and responsive to Processor1.User2 update request, LCM 105 comparison matches the tokens (both have the value '42") and writes through the update page N=11 to external store 117. Also, a copy of the page N=11 and a new token ID '43' for the revised page is entered in table 109 and returned to Processor1.User2.

Figure 6:
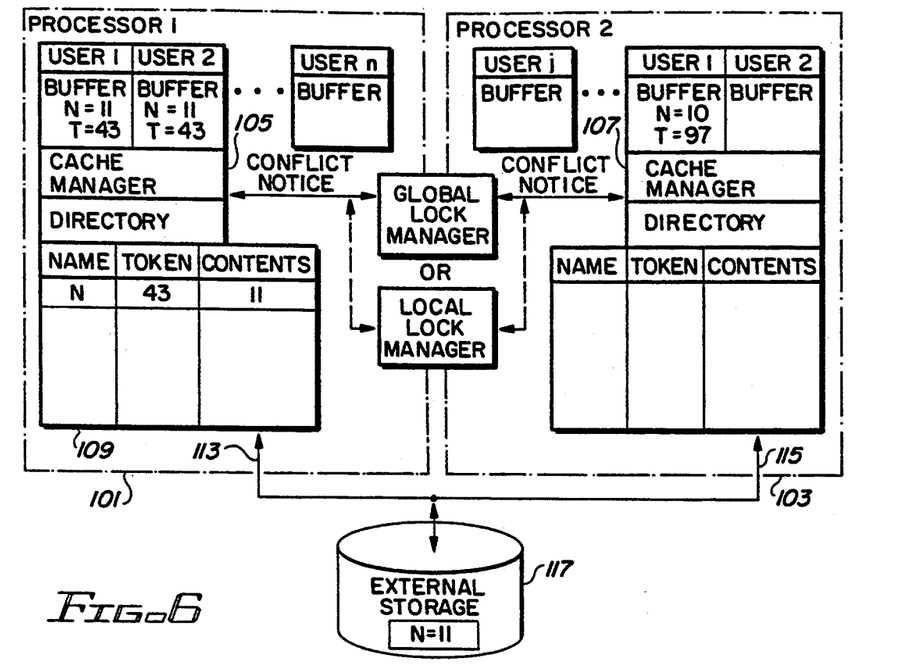

(11) Referring now to FIG. 6, Processor2.User1 now updates page N=11 in its local buffers and requests an update write from LCM 107. Because, the page entry has already aged out from table 111, the request is denied.

Figure 7:
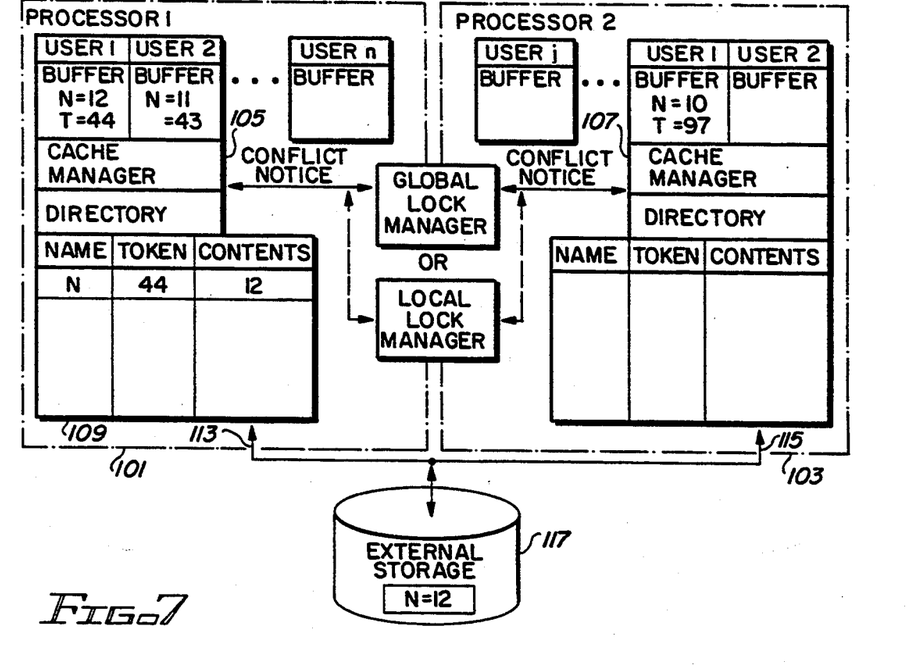

(12) Referring now to FIG. 7, it becomes necessary for Processor2.User1 to retry the request having previously its request denied. Thus, LCM 107 responsive to a page N read request, obtains a share read lock from the local LLM. Since page N is not presently resident in the local cache, LCM 107 causes page N to be re-read from external store 117 to LCM 107, assignment of token ID '98', and entry made into table 111. At this point, Processor2.User1 writes an updated page N=12 and presents both a write request and the token to LCM 107. Because the tokens compare equal, LCM 107 requests an exclusive lock from the local LLM.

Figure 8:
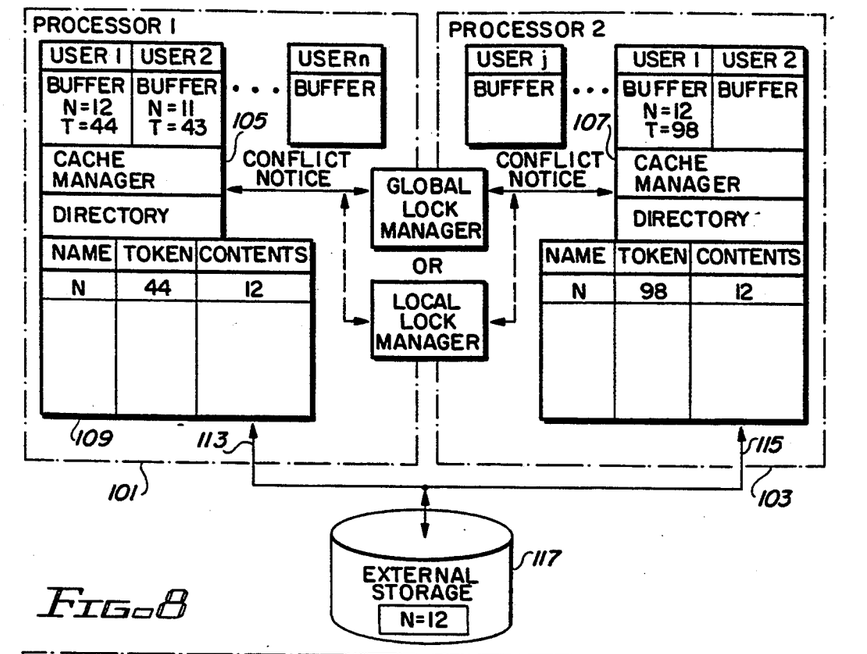

(13) Referring now to FIG. 8, LCM 107 causes page N=12 to be written through the cache to external store 117. Also, the LLM of processor 2 sends an invalidation signal regarding page N to the LLM or processor 1. In turn, page N is invalidated in processor 1 cache 105, the locks relinquished and the entry in the table 109 removed.

Figure 9:
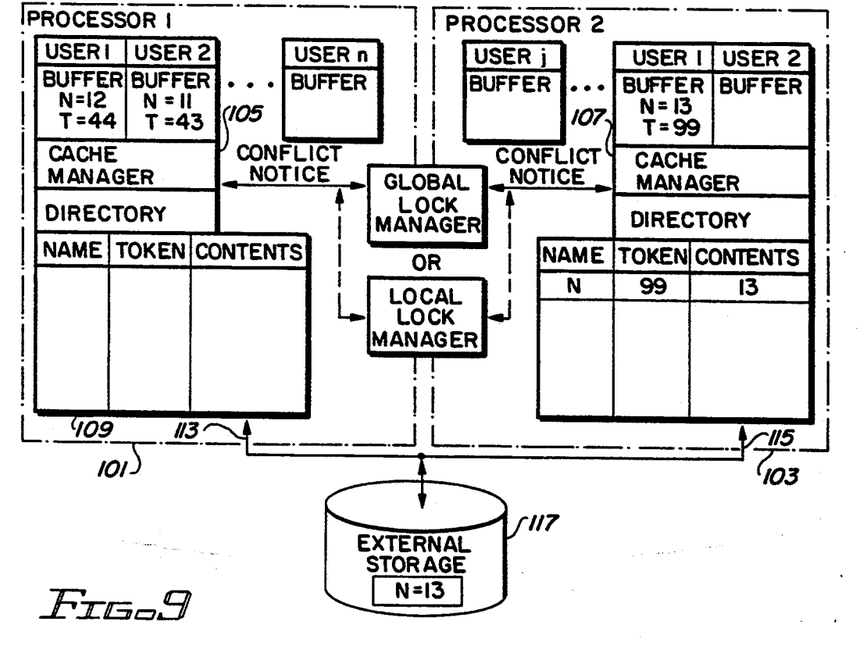

(14) Referring now to FIG. 9, upon Processor2.User1 writing another updated page N, then the request to LCM 107 would be honored because the tokens compare equal. In that event, a new token ID '99' would be assigned, an exclusive lock obtained, and a write through of page N=13 to external store 117 would be made. Also, the entry in table 109 would be removed via the conflict signal between LLM's and LCM 109.

Second Scenario

The second scenario illustrates the method by which three processes defined on two processors can use optimistic concurrency in updating tree organized pages or data. The use of optimistic concurrency shortens the hold time of at least some of the locks. Also, the second scenario illustrates the redo operation resulting from two or more processes updating the same page concurrently. As may be recalled, "optimistic concurrency" is predicated on a low probability of collision such that opportunistic backoff and redo/retry without additional locking is feasible.

Page updating Procedure Per Second Scenario (1) Read pages from the root of the tree up to a subtree of interest.
(2) Designate the pages to be updated or removed from the subtree of interest.
(3) Obtain locks on the pages to be updated or removed.
(4) Check the version ID numbers of the pages to be updated or otherwise dependent thereon. If there are any changes in the version ID numbers, release the counterpart locks and return to step (1).
(5) Write the changed pages through local cache to external storage.
(6) Release all locks.

Cache and Lock Manager Relations in the Second Scenario

Where the lock and cache managers are closely integrated, then exclusive locking of a page should change the version ID number (token) and invalidate other cached copies of the page across processors. Where the integration is at best "loose" such as an application (i.e. Processor 1. User 2) required to make separate lock and caching calls, then a cache primitive for invalidation would be needed and propagated across all processors. A "tree pruning" is one example of a storage operation in which execution of a separate cache primitive would be helpful. In the following discussion, a loosely coupled cache and lock management and a separate invalidation primitive are assumed.

Figure 10:
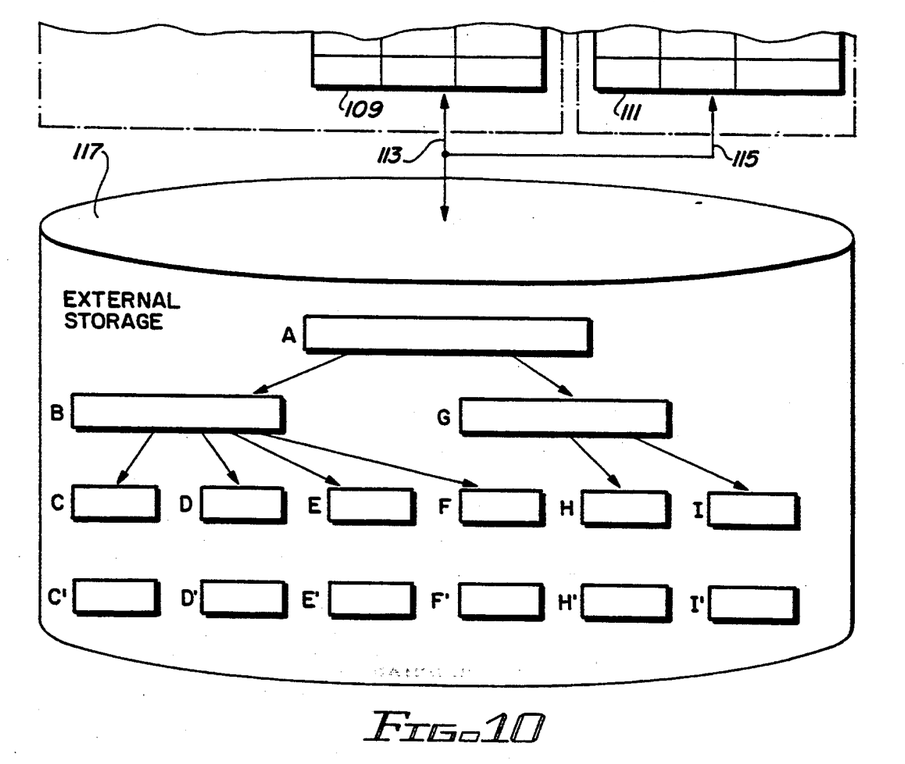
FIGS. 10–16 show three processes defined on two processors using optimistic concurrency in updating tree organized (directory) pages using the method of the invention.

Referring now to FIG. 10, there is shown a tree of related pages or data resident in external store 117. The root page A sports two subtrees expanding from pages B and G respectively. In this regard, C, D, E, and F are leaf pages to B while H and I are leaf pages to G. Lastly, pages C' F', H', and I' are updated or rewritten pages. These will be discussed as needed in the following description.

Figure 11:
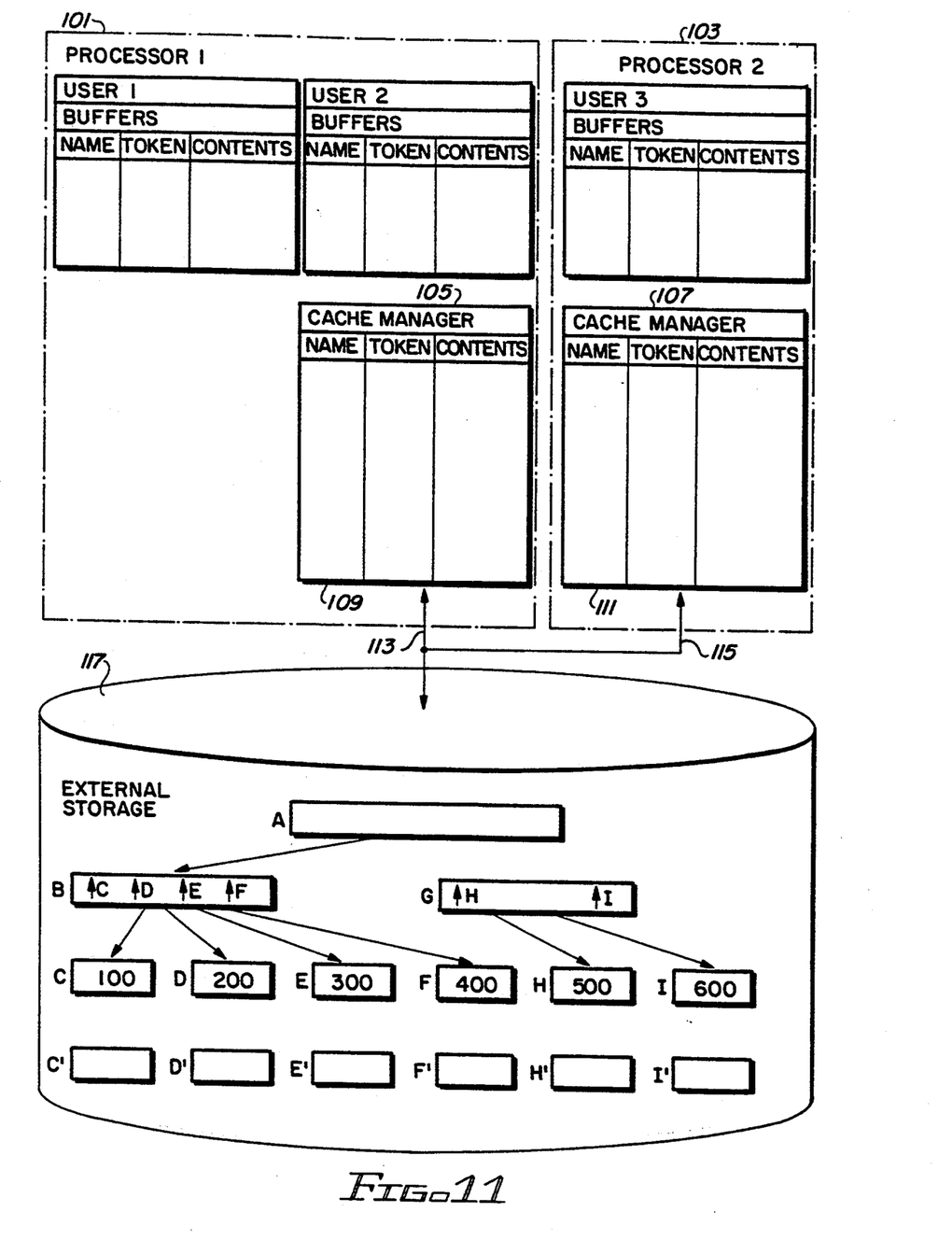

Referring now to FIG. 11, there is shown a block diagram of user buffers, cache managers (105, 107), and table contents (109, 111) of a pair of processes (User1, User2) running on processor 1 and a single process (User3) running on processor 2. Note, that processors 1 and 2 are coupled to external storage 117 over paths 113 and 115. Note, that the pages A-I have contents as set out.

Figure 12:
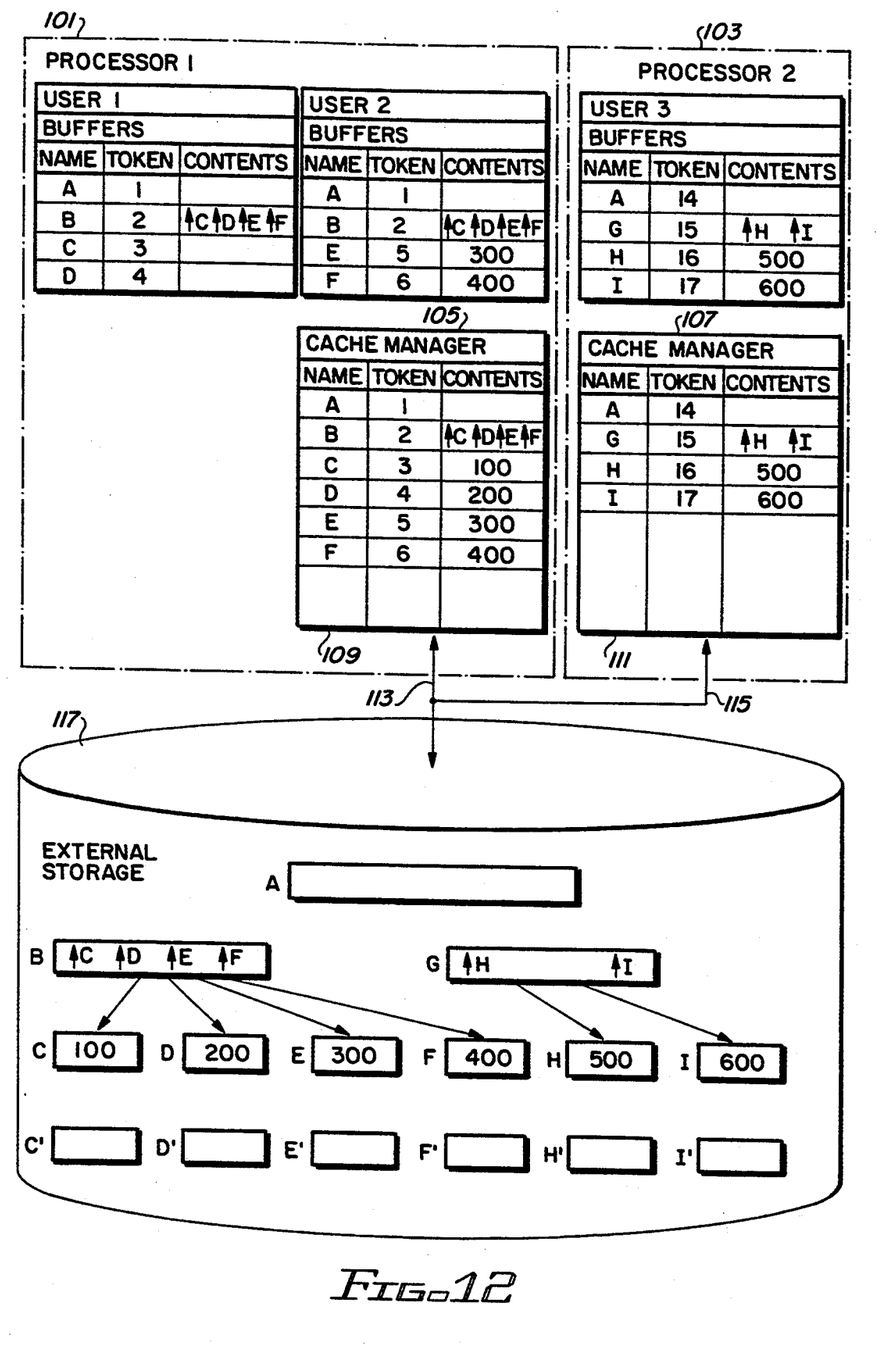

Referring now to FIG. 12, assume that User1 reads pages A, B, C, and D. At this point, LCM 105 assigns tokens 1, 2, 3, and 4 respectively to pages A, B, C, and D, which pages are copied into User1's buffers. Note, that since B is the root node of one subtree its contents include pointers (!C,!D,!E,!F) to successor pages. Also, note that the page content of the User1 buffer matches that of the counterpart cache (i.e. page C=100, page D=200). Similarly, User2 and User3 respectively read pages A, B, E, and F and pages A, G, H, and I. Furthermore, LCM 105 assigns tokens 1, 2, 5, 6 to the pages copied into User2's buffer while LCM 107 assigns tokens 14, 15, 16, and 17 to the pages copied into User3's buffer. Lastly, the cache and buffer contents of pages B and G for User2 and User3 include pointers (!C,!D,!E,!F) and (!H,!I).

Figure 13:
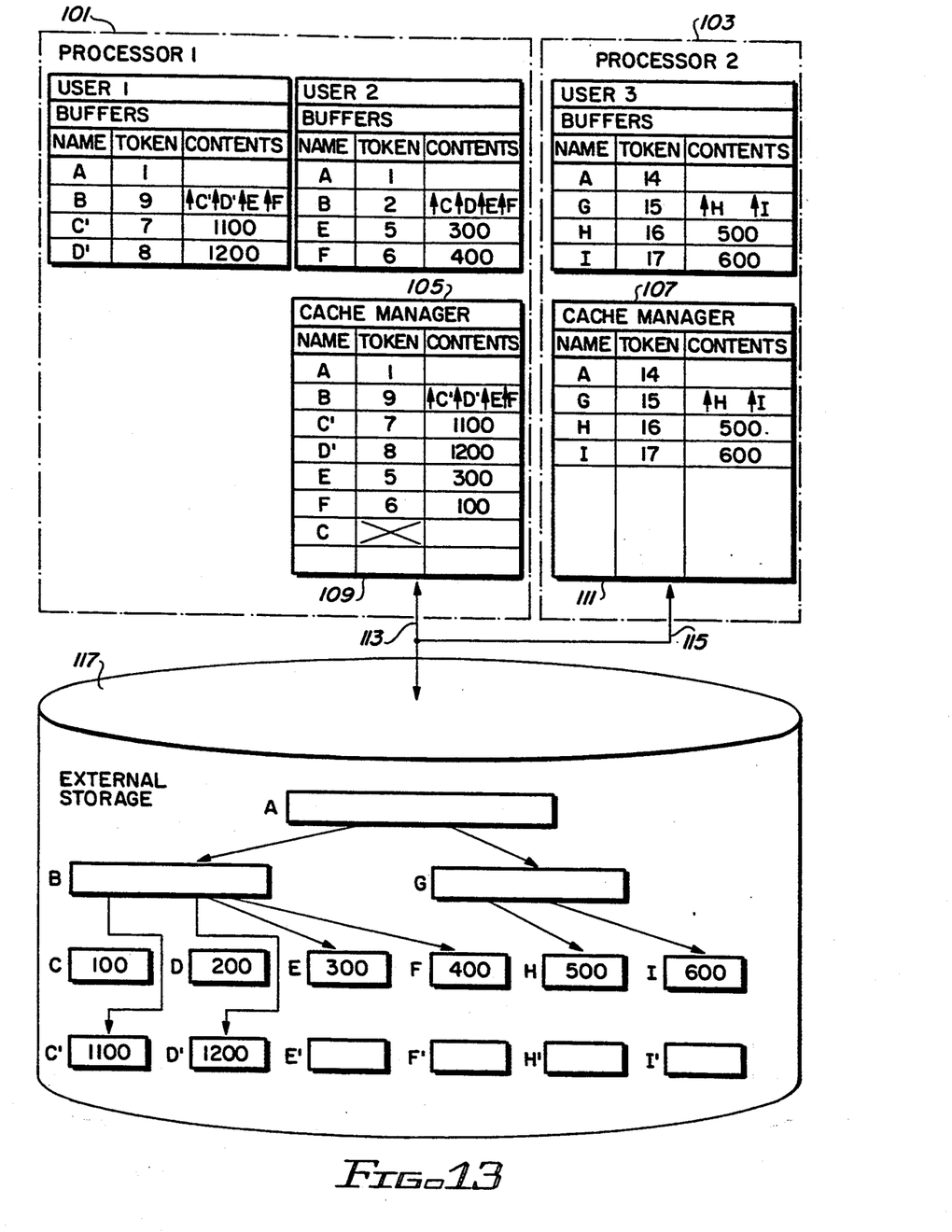

Referring now to FIG. 13, assume that User1 determines that new pages C' and D' should be created and that page B should be rewritten with pointers to C' and D'; that User2 determines that pages E' and F' should be created and that page B should be rewritten with pointers to E' and F'; and that User3 determines that pages H' and I' should be created and that page G should be rewritten with pointers to H' and I'.

Following the scenario, User1 obtains exclusive locks on pages B, C, D, C', and D'. User1 then verifies that pages B, C, and D have not been updated since the tokens it presents to LCM 105 match the tokens generated by said LCM 105. Prior to User1 writing pages C', D' and B through cache 109 to external store 117, tokens 7, 8, and 9 are respectively assigned by LCM 105 and copied to User1 buffers. Next User1 releases all locks.

Figure 14:
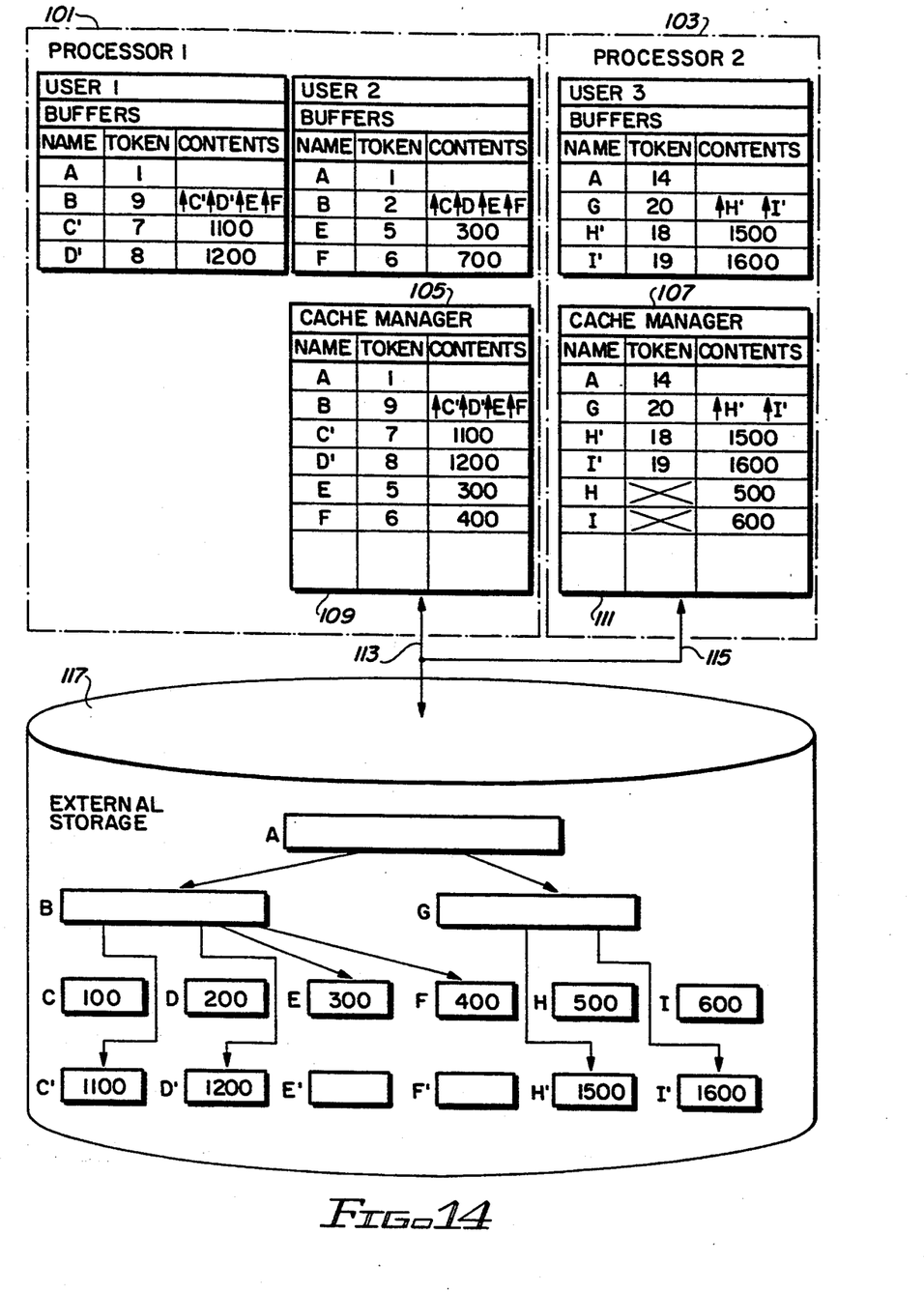
Figure 15:
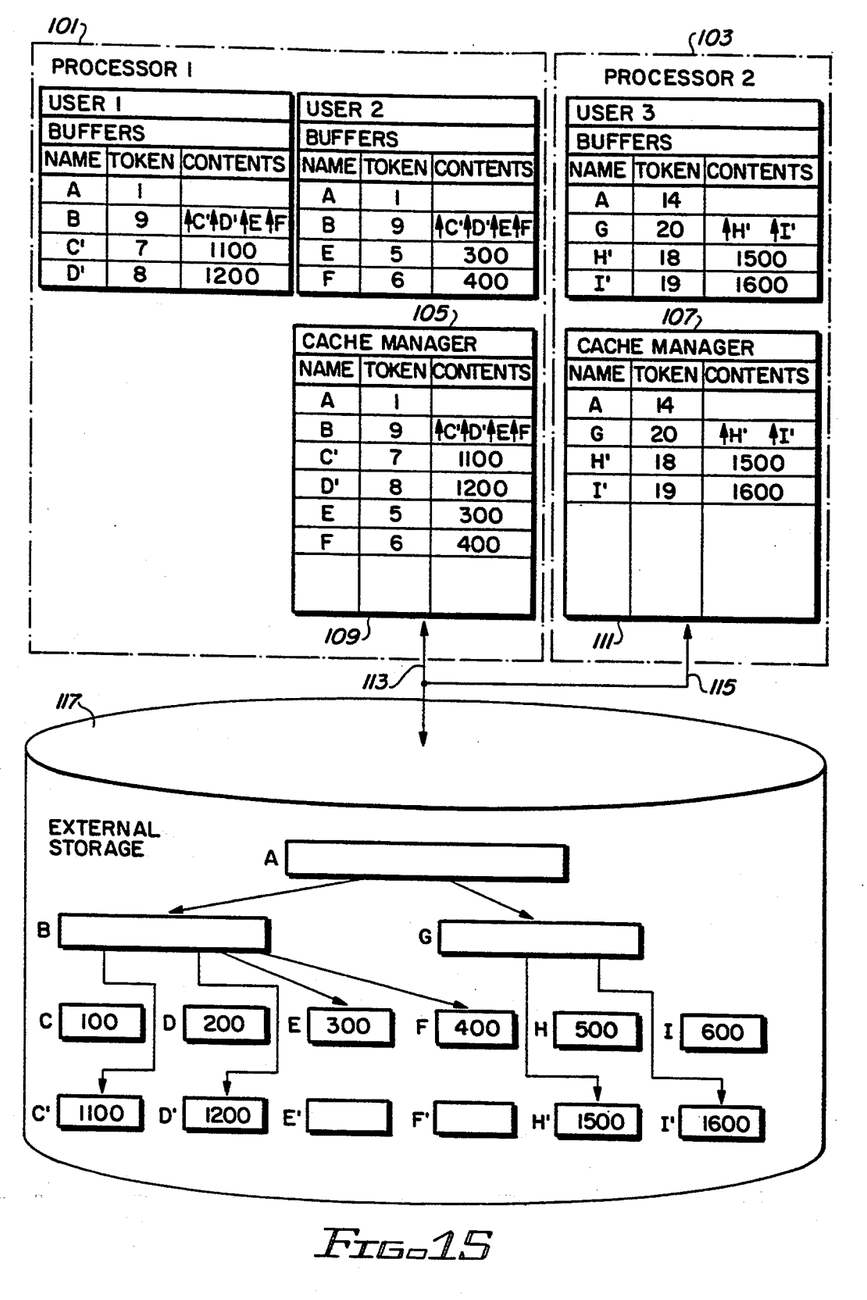

Referring now to FIG. 14, User3 obtains exclusive locks on pages G, H, I, H', and I'. It follows that User3 affirms that pages G, H, and I have not changed since the tokens in the buffer match those resident in cache 111 via LCM 107. Next, User3 writes pages H', I', and G and pages H and I are invalidated in cache 111. User3 then releases all locks. Note, the pointers in page G have been updated.

Consider that in order for User 2 to create new pages E' and F' and update page B, it must treat with the fact that the token for page B resident in its buffer does not match the contents of cache 109. This means that a change has taken place as detected by LCM 109 and that User2 must redo. Now, User 2 releases all locks and rereads pages A, B, E, and F from cache 109.

Referring to FIG. 15, User2 again determines that pages E' and F' should be created and that page B should be changed. User2 then obtains exclusive locks on pages B, E, F, E', and F' and that the pages conform to the cache versions since the tokens match.

Figure 16:
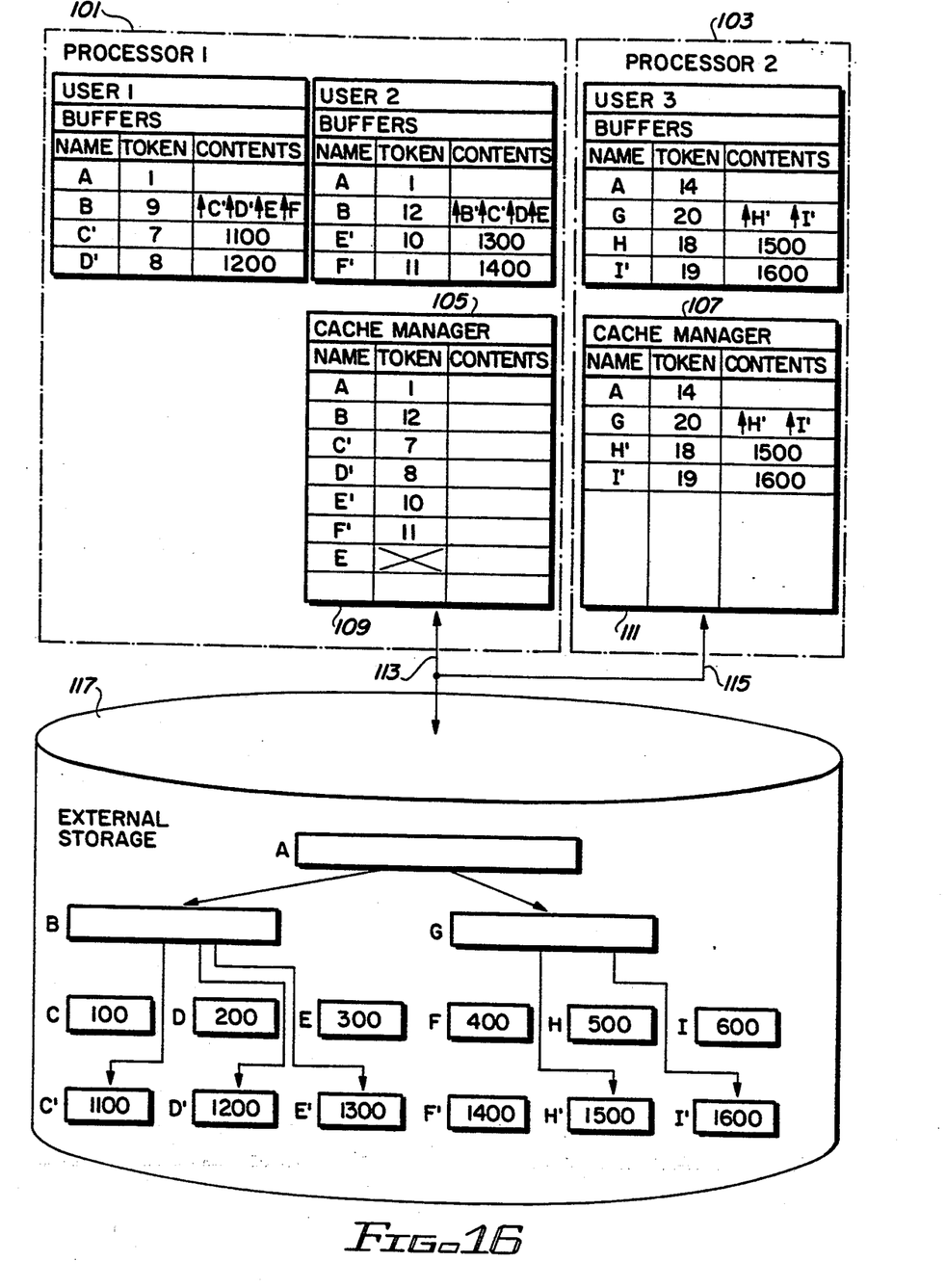

Referring now to FIG. 16, User2 writes pages E', F', and B and invalidates tokens for E and F. Lastly, User2 releases all locks.

Extensions

It is convenient to generate tokens through the use of a serial counter. However, any mechanism may be used in which the token value remains unique in the local cache context during the lifetime of all the processes.

Conflict notification among local lock managers as the event initiating cache consistency can use conditional broadcast, broadcast upon change, and the use of a shared directory.

These and other extensions of the invention may be made without departing from the spirit and scope thereof as recited in the appended claims.

What is claimed is:

1. In a system having a first and a second processor and a shared page managed external store, each processor having a data cache, and path establishing means to said external store, said path establishment means including page locking means, cache management means, and means for communicating conflict notices among the locking means and cache management means, a method for managing concurrency among processes executing upon said processors accessing said external store, and, for managing the granting of new locks while ensuring consistency of the copies of pages resident among the data caches with the original pages in the external store, comprising the steps of:

(a) responsive to a read request by a process executing on the first processor to access a page, establishing a sharable lock path to said page in the first processor cache or as refreshed from external store thereto by said path establishment means including the page locking and first processor cache management means, and, remitting a copy of the requested page either resident in the first processor cache or refreshed therein from external storage and a sequentially assigned identity number (ID) to said requesting process by said first processor cache management means;

(b) responsive to a write request by the process of step (a) to modify said page, which request includes the ID number remitted with the copy of the page and assigned to the process, comparing the ID number accompanying the request with that of the copy in the first processor cache, and (1) upon comparison match thereof by said first processor cache management means, invalidating all cache resident copies of the page among the processors by each cache manager erasing the page from the counterpart cache responsive to an indication of the match broadcast via the conflict notice means by the first processor cache management means, releasing shared lock paths to the page and establishing an exclusive lock path for the requesting process to the page resident in the first processor cache by said page locking means responsive to the first processor cache management means, and causing the writing of an update of said first page by the first processor cache management means through the first processor cache to the external store, assigning another ID number in sequence to the updated page, and copying back the updated page and the newly assigned ID number to the requesting process by said first processor cache management means, and releasing the exclusive lock path by said page locking means responsive to the first processor cache management means; or (2) upon a comparison mismatch thereof by said first processor cache management means, refusing to grant an exclusive lock to the requesting process by said page locking means responsive to a mismatch indication from the first processor cache management means, and repeating ad seriatim the operations in steps (a) and (b) by interpreting said write request ab initio as a read followed by a write request to the same page on either an opportunistic or fixed interval basis.

2. The method according to claim 1, wherein at least some of the pages resident in external store are hierarchically related, and further wherein responsive to a write request to a hierarchically related page, said pages forming a logical set of pages defined by a tree connected set of address pointers, the method comprises the additional steps of:

(c) reading pages from the root of the tree up to a subtree of interest, and, designating the pages to be updated or removed from said subtree;

(d) obtaining exclusive locks on the pages to be updated or removed;

(e) comparing the ID numbers of the pages to be updated or otherwise dependent thereon accompanying the write request with the pages resident in the first processor cache, and (1) upon comparison mismatch by said first processor cache management means, releasing the counterpart locks by said page locking means responsive to a mismatch indication from the first processor cache management means and returning to step (a); and (2) upon comparison match, writing the updated pages through the first processor cache to external storage, and releasing all locks by said page locking means responsive to the first processor cache management means.

3. The method according to claim 1, wherein step (a) includes the step of ensuring that any value constituting the ID remains unique in the first processor cache context during the lifetime of all the processes.

4. A method for managing concurrency among processes defined over first and second processors, said processors accessing a shared page managed external store, each processor including an operating system (OS), an LRU page organized data cache, a local cache manager (LCM), and a local lock manager (LLM), said LLM's communicating to each other a contention signal identifying a page being updated responsive to an LCM exclusive lock request, comprising the steps of:

(a) responsive to each read request by a process executing on the first processor to the first processor LCM for access to a page either resident in said first processor cache or refreshed therein from the external store, referencing the first processor LLM responsive to the LCM and establishing a sharable lock path to said page in the first processor cache, and remitting a copy of the requested page either resident in the first processor cache or as refreshed therein from the external store with a sequential identification (ID) number by the first processor LCM to the requesting process;

(b) responsive to a request to the first processor LCM to write an update to a page by the process of step (a), which request includes the ID number remitted with the copy of the page to the process by the first processor LCM, comparing the ID number accompanying the request with that of current ID number of the copy resident in the first processor cache, and (1) upon comparison match thereof by said first processor LCM, invalidating all cache resident copies of the page by notification to the second processor LLM by the first processor LLM and removal of any cache resident counterpart pages by the respective first or second LCM's, both releasing shared lock paths to the page, and establishing an exclusive lock path for the requesting process to the page via the first processor LLM responsive to said first processor LCM, and causing the writing the update through the first processor cache by the first processor LCM to external store, assigning another ID number to the page as updated and copying back said page as updated to the requesting process by the first processor LCM, and releasing the exclusive lock path by said first processor LLM responsive to the first processor LCM; or (2) upon a comparison mismatch thereof by said first processor LCM, refusing to grant an exclusive lock to the requesting process by said first processor LLM responsive to the first processor LCM, and repeating ad seriatim the operations in steps (a) and (b) by interpreting said write request ab initio as a read followed by a write request to the same page on either an opportunistic or fixed interval basis.

5. A method for managing the number of locks acquired by in-flight processes defined over multiple processors, each processor including an operating system, a local cache operatively formed from processor internal memory, DASD oriented external store, and lock (LLM) and cache (LCM) resource managers, said processes generating read and write ops executed on the multiple processors, said read and write ops utilizing directory lockable access paths to pages either resident in cache or as refreshed into cache from the external store, said LLM's communicating to each other a contention signal identifying a page being updated responsive to an LCM exclusive lock request as made to the LCM of the first processor, comprising the steps of:

(a) responsive to each read access request by a process executing on a first one of the processors to a page either resident in the counterpart cache or refreshed therein from the external store, obtaining a shared lock access path to said page through the counterpart LCM and as granted by the LLM of the first processor, and, remitting a copy of said page either resident in the counterpart cache or refreshed therein from the external store and a version number to the requesting process by the first processor LCM; and (b) responsive to a request to write an update to the page by the process of step (a), which request includes the version number remitted with the copy of the page by the given processor LCM, comparing the version number accompanying the request with that of the copy resident in the first processor cache, and (1) upon comparison match thereof by the first processor LCM and notification of the first processor LLM by the first processor LCM, notifying all holders of shared locked access to the same page of conflict by signaling the LLM in other processors via the first processor LLM, invalidating all cache resident copies of the page by the first LCM and LCM's of the other processors, relinquishing the shared locked access by the LCM's, granting exclusive locked access to the requesting process to the page by the first processor LLM, and writing the update to store and assigning another version number thereto by the first processor LCM; or (2) upon a comparison mismatch thereof by the first processor LCM, refusing to grant an exclusive lock to the requesting process by said first processor LLM responsive to the first processor LCM, and repeating ad seriatim the operations in steps (a) and (b) by interpreting said write request ab initio as a read followed by a write request to the same page on either an opportunistic or fixed interval basis.

* * * * *

UNITED STATES PATENT AND TRADEMARK OFFICE
CERTIFICATE OF CORRECTION

PATENT NO. : 5,410,697
DATED : April 25, 1995
INVENTOR(S) : R. Baird et al

It is certified that error appears in the above-indentified patent and that said Letters Patent is hereby corrected as shown below:

On the Title page, item [75], inventor:

Jay G. Unger should be Jay H. Unger;

item [56], Attorny, Agent, or Firm:

should be R. Bruce Bodie

Signed and Sealed this

Tenth Day of October, 1995

Attest:

BRUCE LEHMAN

*Attesting Officer*      *Commissioner of Patents and Trademarks*